United States Patent [19]

Mayer

[11] 3,985,399
[45] Oct. 12, 1976

[54] ANTI-LOCK DEVICE FOR FLUID BRAKES

[75] Inventor: Friedrich Mayer, Augsburg, Germany

[73] Assignee: Carsec AG, Zug, Switzerland

[22] Filed: Aug. 27, 1975

[21] Appl. No.: 608,068

[52] U.S. Cl. .............................. 303/21 AF; 303/10; 303/21 F; 303/61
[51] Int. Cl.² .......................................... B60T 8/02
[58] Field of Search .......... 303/21 F, 21 AF, 61–63, 303/68–69, 10, 20, 21 A, 21 R, 40; 188/181 A, 181 R

[56] References Cited
UNITED STATES PATENTS

| | | | |
|---|---|---|---|
| 3,420,580 | 1/1969 | Dymond | 303/21 F |
| 3,556,615 | 1/1971 | Stelzer | 303/21 F |
| 3,671,085 | 6/1972 | Pasek et al. | 188/181 A X |
| 3,677,608 | 7/1972 | Lewis | 188/181 A |
| 3,726,568 | 4/1973 | Krugler, Jr. | 303/21 F |
| 3,813,130 | 5/1974 | Inada | 303/21 F |

*Primary Examiner*—Trygve M. Blix
*Assistant Examiner*—Douglas C. Butler
*Attorney, Agent, or Firm*—James E. Nilles

[57] ABSTRACT

Brake lock in a fluid operated braking system is automatically suppressed by a brake diminishing cylinder and piston unit between the master cylinder and at least one wheel brake cylinder. Spring pressure upon the brake diminishing piston is normally overbalanced by a backstop pressure which is monitored by a wheel sensor. When a brake lock is imminent the backstop pressure drops and causes shifting of the brake diminishing piston from a first position in which it connects the main cylinder with the wheel cylinder into a second position in which it disconnects the main cylinder from the wheel cylinder and lowers the fluid pressure in the latter. Timely restoration of the backstop fluid pressure is insured by electrical contact elements disposed on the brake diminishing piston and engageable with complementary electrical contacts on the brake diminishing cylinder and functional to cause increased backstop pressure to be applied.

7 Claims, 4 Drawing Figures

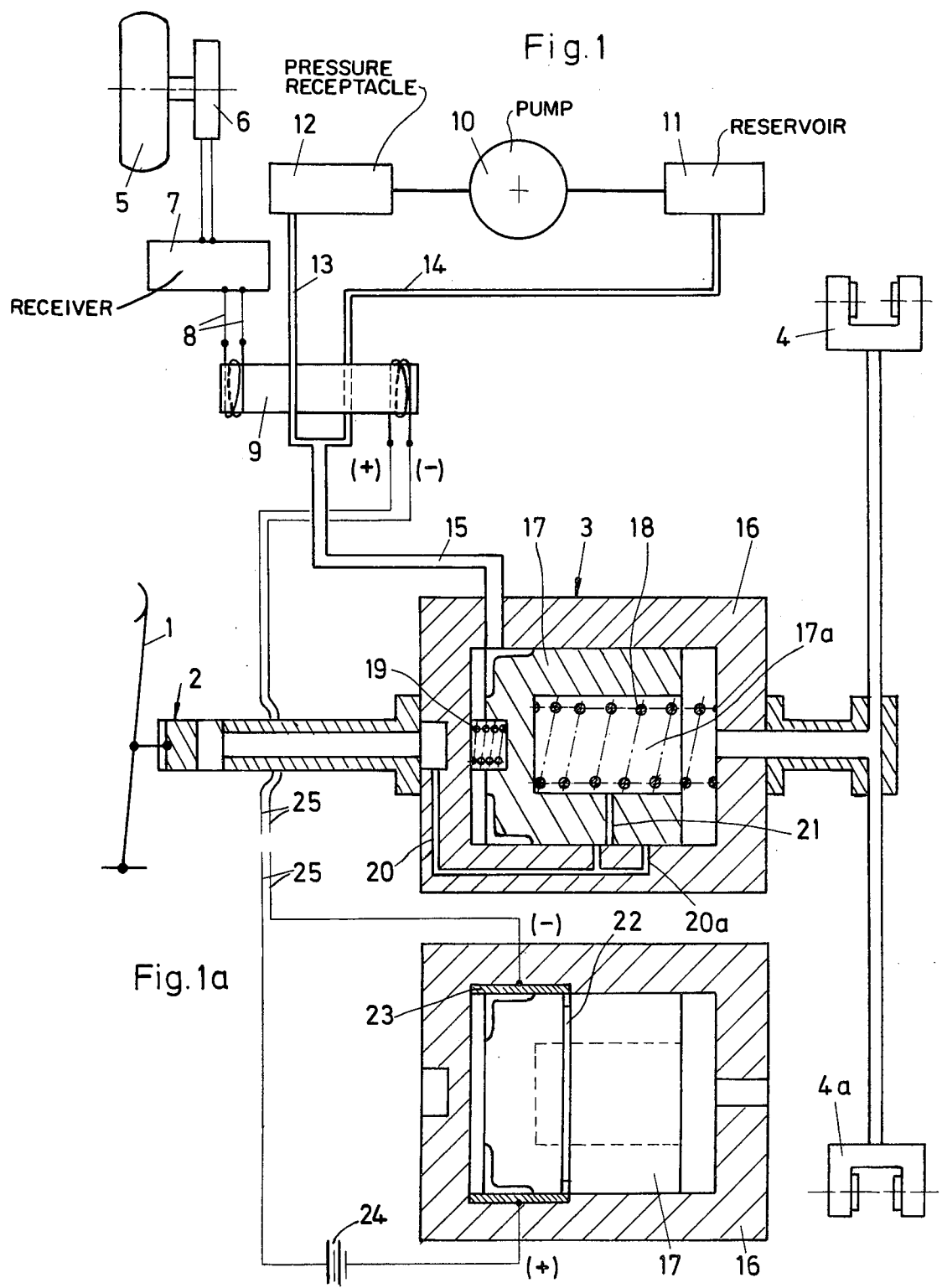

ANTI-LOCK DEVICE FOR FLUID BRAKES

BACKGROUND OF THE INVENTION

The invention relates to an anti-lock device for fluid operated brakes which comprises a brake diminishing cylinder and a brake diminishing piston which is reciprocable within the cylinder by a variable backstop pressure at one side of the piston in opposition to the thrust of a spring at the other side thereof; the piston being effective when in a first position of adjustment for normal braking to permit unrestricted flow of pressure fluid from a main cylinder provided with an associated actuating element, to at least one wheel brake cylinder; and variation of the backstop pressure under the control of a wheel sensor being effective to move the piston into a second position of adjustment for anti-lock in which it interrupts the flow of pressure fluid to the wheel brake cylinder and enlarges the braking fluid confining space between the brake diminishing piston and the wheel brake cylinder.

An anti-lock device for fluid operated brakes has heretofore been known wherein a brake diminishing piston is urged by the combined pressure of braking fluid and of a spring into a first position of adjustment in which it unblocks a flow passage between a main cylinder and a wheel brake cylinder. When an associated wheel sensor signals an imminent brake lock a backstop pressure is built up in opposition to the pressure of the spring and braking fluid which urges the brake diminishing piston into a second position of adjustment in which the braking fluid passage is blocked and the braking effect is eliminated by enlargement of a braking fluid confining space between the brake diminishing cylinder and the wheel brake cylinder. If, in this case, the control of the backstop pressure fails, as for instance due to a valve for reducing the backstop pressure becoming stuck or due to a malfunctioning of the electrical control system, the pressure fluid passage from the main cylinder to the brake cylinder remains blocked even when a normal brake action is desired by operation of the brake actuating element which is normally a brake pedal. This may result in dangerous driving conditions.

Another anti-lock device for fluid brakes has also heretofore been known wherein a spring loaded check valve is placed into the pressure fluid passage between the main cylinder and the wheel brake cylinder. To provide for normal braking the valve ball of the check valve is raised from its seat by a brake diminishing piston which in turn is urged by a backstop fluid pressure into a first position of adjustment. When a brake lock is imminent the backstop fluid pressure is reduced so that the check valve closes and the brake diminishing piston enlarges the volume between the wheel brake cylinder and the brake diminishing cylinder. If upon disappearance of the locking hazard, restoration of the backstop fluid pressure should fail, normal braking would be impossible because of the closure of the check valve. In order to overcome this disadvantage the mentioned prior art anti-lock is designed so that upon lowering of the backstop fluid pressurs below a predetermined lower limit a spring loaded safety piston moves the brake diminishing piston into its adjusted position for normal braking in which it opens the check valve. With no backstop pressure effective the fluid passage between the main and brake cylinders is thus reopened so that normal braking without anti-lock protection will be possible. The mentioned prior art anti-lock device has the disadvantage of being structurally complicated and mechanically trouble-prone. It requires an individual check valve and a supplemental spring loaded safety piston.

SUMMARY OF THE INVENTION

The present invention provides an improved anti-lock device of the hereinbefore outlined general character but which affords the advantage of structural simplicity in providing for normal brake action in case the control of the backstop pressure fails.

To that end, the invention contemplates to provide for a third position of the brake diminishing piston into which it may move upon failure of the backstop pressure and in which it establishes a further connection between the main cylinder and the brake cylinder; and further to provide the brake diminishing piston with an associated motion intercepting device which prevents the piston from moving into said third position while the backstop pressure is effective.

In the anti-lock device embodying the invention, the brake diminishing piston moves automatically, due to a change—be it an increase or decrease— of the backstop pressure, into a safety position in which it reestablishes brake fluid flow if for one reason or another the control of the backstop fluid pressure should fail. This movement which accordingly is induced by the backstop pressure itself or by the spring pressure requires no additional structural element. Consequently, in affording this additional safety function, the anti-lock device according to the invention preserves a structural advantage of other devices of this kind, namely the absence of valves due to the assumption of the valve functions by the brake diminishing piston itself.

A brake diminishing system has heretofore been known whose piston establishes a brake fluid passage in its position for normal braking and also in a different position of adjustment. Such different piston position, however, is obtained already at the end of the normal anti-lock process and has the purpose to re-start the backstop pressure increase already near the end of the anti-lock effecting phase.

BRIEF DESCRIPTION OF THE DRAWINGS

The foregoing and other objects and advantages of the invention will become more fully apparent as this specification proceeds with reference to the accompanying drawings wherein:

FIG. 1 is a diagram of an anti-lock device embodying the invention;

FIG. 1a shows portions of the electrically controlled motion intercepting device in conjunction with a brake diminishing cylinder and piston;

DETAILED DESCRIPTION

Figure 2A:
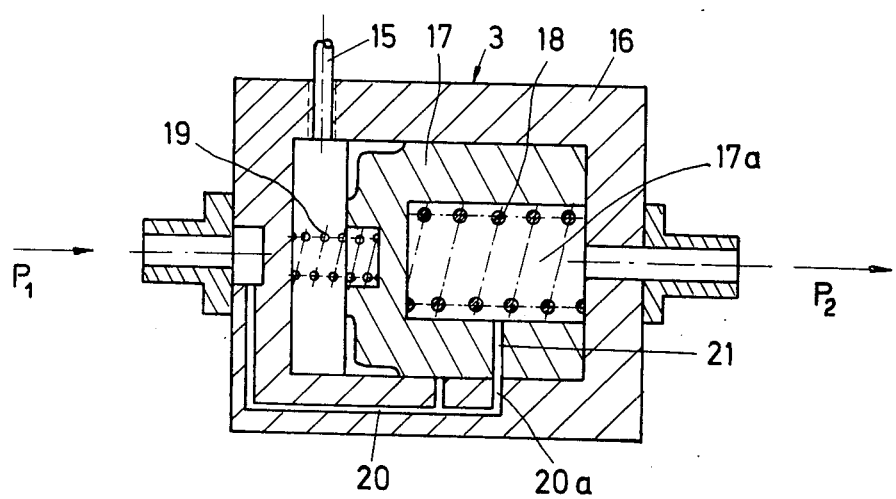
FIG. 2a shows the brake diminishing piston in a first position of adjustment for normal braking.

As shown in FIG. 1, a brake pedal 1 is operatively connected with a main cylinder 2. The braking pressure developed in the cylinder 2 activates via a brake diminishing unit 3, wheel brakes 4, 4a, which are connected, respectively, to front and rear wheels.

Designated by the reference numeral 5 is a front wheel whose number of revolutions is monitored by a wheel sensor 6.

The signals of the wheel sensor 6 are transmitted to an electronic information receiver 7. The receiver 7 operates an electromagnetic control valve 9 via conductors 8.

A pump 10 draws pressure medium from a reservoir 11 and delivers it to a pressure receptacle 12. The pressure receptacle 12 and the reservoir 11 are connected by conduits 13, 14 with a backstop pressure line 15. The electromagnetic valve 9 is operatively connected with the conduits 13, 14.

The backstop pressure line 15 terminates within the cylinder 16 of the brake diminishing unit 3. Reciprocable within the cylinder 16 is a brake diminishing piston 17 which is engaged by a pressure spring 18. The thrust of the spring 18 is opposed by the thrust of a much weaker counter-spring 19. The operation of the described device is as follows:

Under normal driving conditions the parts of the brake diminishing unit 3 are positioned as shown in FIG. 2a. When a braking effort is made the fluid pressure developed in the main cylinder 2 is extended in the direction of arrow $P_1$ through a duct 20 in the brake diminishing cylinder 16. The duct 20 has an outer port 20a which in the first position of the brake diminishing piston as shown in FIG. 2a registers with a through passage 21 of the brake diminishing piston 17. The pressure medium may therefore pass into the interior space 17a of the brake diminishing piston 17 and from there in the direction of arrow $P_2$ to the wheel brakes 4, 4a. Accordingly, a normal braking action is afforded in this case as if no brake diminishing unit 3 were present. The FIG. 2a first position of the brake diminishing piston 17 is established by the fact that the control valve 9 is in its FIG. 1 position in which the pressure receptacle 12 communicates in flow establishing relation with the brake diminishing cylinder 16 through the conduits 13, 15. Since the backstop fluid pressure conduit 15 terminates at the side of the pressure diminishing piston 17 opposite to the pressure spring 18, the backstop fluid pressure over-balances the thrust of the pressure spring 18 and maintains the brake diminishing piston 17 in contact with the right end of the cylinder 16 as seen in FIG. 2a.

If now the wheel sensor 6 signals that the front wheel 5 threatens to lock, the electronic information receiver 7 emits a signal to the electromagnetic control valve 9 which causes the latter to interrupt the conduit 13 and to connect the backstop fluid pressure line 15 with the conduit 14. The pressure spring 18 is now able to move the brake diminishing piston 17 from its first position toward the left into a second position as seen in FIG. 1 and to thereby backfeed the backstop fluid pressure medium through the line 15 and the conduit 14 into the pressure medium reservoir 11. Also, the movement of the piston 17 to the left causes the outer port 20a of the duct 20 (FIG. 1) so that the braking pressure developed in the main cylinder 2 will no longer be extended to the wheel brakes 4, 4a. At the same time, the volume between the wheel brakes 4, 4a and the piston 17 is enlarged by the movement of the latter toward the left into its second position as seen in FIG. 1, so that the braking pressure is reduced and the braking action is cancelled. In this manner, an imminent brake lock is suppressed.

As shown in FIG. 1a, the brake diminishing piston 17 which is formed of electrically non-conducting material, for instance a synthetic compound, carries on its circumference an electrically conducting contact ring 22. During the movement of the piston 17 from its first adjusted position for normal braking (FIG. 2a) into its second adjusted position for anti-lock (FIG. 1) the contact ring 22 engages a counter-contact assembly 23 (FIG. 1a) which is mounted within the brake diminishing cylinder 16. The counter-contact assembly 23 which in the FIG. 2a position of the parts is open and closed by movement of the piston 17 into a third position of adjustment as shown in FIG. 1a. Closing of the contact-assembly 23 produces by means of a current source 24, a signal which is transmitted to the control valve 9 through electrical conductors 25. The valve 9 is thereby actuated so as to cause restoration of the backstop pressure in the brake diminishing cylinder 16 through the conduit 13 and backstop pressure line 15. As a result, the braking pressure is gradually built up again until the outer port 20a registers with the through passage 21 and normal braking thereby again becomes possible.

Figure 2B:
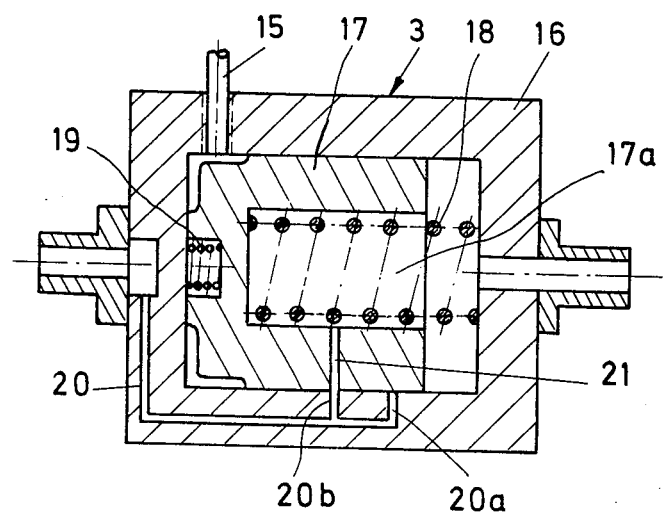
FIG. 2b shows the brake diminishing piston in its third position of adjustment.

The described process repeats itself until the anti-lock braking operation has been completed. If for one reason or another, for instance due to failure of the hereinbefore described electrical control, of the electronic information receiver 7, of the control valve 9 or of the pump 10, the backstop pressure within the brake diminishing cylinder 16 is not timely restored, the brake diminishing piston 17 will then move under the thrust of the pressure spring 18 into its FIG. 2b third position. In that position an inner tap 20b of the duct 20 registers with the through passage 21 of the brake diminishing piston 17. The interior space 17a of the piston 17 and therefore also the cylinders of the wheel brakes 4, 4a will in that case again communicate in flow establishing relation with the main cylinder. Consequently, normal braking will be possible, although without anti-lock protection.

When an orderly restoration of the backstop fluid pressure again becomes possible, the brake diminishing piston 17 returns into its FIG. 2a first position.

It should be noted that the provision of automatic motion intercepting means such as are afforded by the elements 9 and 22–25 and which cause a reversal of the movement of the brake diminishing piston after a predetermined travel or time interval independently of the sensor signal, is also significant without the third adjusted position of the brake diminishing piston. It permits a structural simplification of the electronic information receiver.

I claim:

1. An anti-lock device for fluid operated brakes comprising: fluid pressure transmitting means for controlling fluid pressure applied to fluid operated brakes, said fluid pressure transmitting means including a brake diminishing cylinder and a piston within said brake diminishing cylinder, said piston including a fluid passage therein, said piston movable to a first position to permit fluid flow through said fluid passage and through said fluid pressure transmitting means, to a second position wherein fluid flow through said fluid passage is prevented, and to a third position to permit fluid flow through said fluid pressure transmitting means, said third position being spaced from said first position; spring means operably connected to said piston to bias said piston from said first position toward said second position; a fluid pressure chamber defined by said cylinder and said piston; means for applying fluid pressure to said chamber and for biasing said piston from said second position toward said first position in opposition to said spring means; and motion intercepting means operatively associated with said piston for preventing movement of said piston to said third position.

2. An anti-lock device as set forth in claim 1, wherein said motion intercepting means comprises an electrical contact element secured to said piston and a contact assembly mounted on said cylinder, said contact assembly being engageable by said contact element upon movement of said piston from said second position toward said third position.

3. The anti-lock device set forth in claim 1 wherein said cylinder includes a first and second passage selectively communicable with said fluid passage in said piston, said first passage communicating with said fluid passage when said piston is in said first position and said second passage connecting said fluid passage when said piston is in said third position.

4. In a fluid operated braking system, the combination of: a braking fluid pressurizing main cylinder; at least one wheel brake cylinder; fluid pressure transmitting means operatively interposed between said main cylinder and said wheel brake cylinder, said pressure fluid transmitting means comprising a brake diminishing cylinder for regulating fluid pressure communication between said main cylinder and said wheel brake cylinder, and a piston within said brake diminishing cylinder; first fluid pressure conduit means for connecting said main cylinder and said brake diminishing cylinder, second fluid pressure conduit means connecting said brake diminishing cylinder and said wheel brake cylinder; said piston including a fluid passage therein, said piston being movable between a first position wherein said fluid passage connects said conduits for fluid flow therethrough and a second position wherein fluid flow through said passage and through said conduits is prevented; spring means connected to said piston and operable to bias said piston from said first position toward said second position; a fluid pressure chamber defined by said cylinder and said piston; means for applying fluid pressure to said chamber for biasing said piston from said second position toward said first position in opposition to said spring means; and said brake diminishing cylinder and piston including motion intercepting means for reversing movement of said piston when said piston has moved a predetermined distance from said first position toward said second position.

5. The fluid operated braking system set forth in claim 4 wherein said piston is movable to a third position wherein said fluid passage in said piston connects said conduits for fluid flow therethrough.

6. The fluid operated braking system set forth in claim 5 wherein said cylinder includes a first passage and a second passage selectively communicable with said piston fluid passage, said first passage communicating with said fluid passage when said piston is in said first position and said second passage communicating with said fluid passage when said piston is in said third position.

7. The fluid operated braking system set forth in claim 5 wherein said motion intercepting means comprises an electrical contact element secured to said piston, and a contact assembly mounted on said cylinder, said contact assembly being engageable by said contact element upon movement of said piston from said second position toward said third position.

* * * * *